United States Patent [19]
Kenrick

[15] 3,698,170
[45] Oct. 17, 1972

[54] CATCHER FOR FRUITS, NUTS, AND THE LIKE
[72] Inventor: Joseph F. Kenrick, 734 East Fairmont, Fresno, Calif. 93704
[22] Filed: May 19, 1971
[21] Appl. No.: 144,760

[52] U.S. Cl. .................................................56/329
[51] Int. Cl. ...............................................A01g 19/06
[58] Field of Search ..........................56/329, 328 TS

[56] References Cited

UNITED STATES PATENTS

| | | | |
|---|---|---|---|
| 3,250,065 | 5/1966 | Frost | 56/329 |
| 1,571,298 | 2/1926 | Pavloff | 56/329 |
| 136,072 | 2/1873 | Kisor | 56/329 |
| 3,548,579 | 12/1970 | Shipley, Jr. | 56/329 |
| 2,602,279 | 7/1952 | Leighton | 56/329 |
| 3,338,041 | 8/1967 | Arpin | 56/329 |

FOREIGN PATENTS OR APPLICATIONS

| | | | |
|---|---|---|---|
| 782,934 | 3/1935 | France | 56/329 |
| 617,027 | 1/1926 | France | 56/329 |

Primary Examiner—Louis G. Mancene
Assistant Examiner—J. N. Eskovitz
Attorney—Huebner & Worrel

[57] ABSTRACT

A catcher for fruits, nuts, and the like including a mobile vehicle, a hopper, means mounting the hopper on the vehicle for slidable movement between a predetermined catching position and a position spaced transversely of the vehicle from the catching position and at which the hopper is removable from said means, a frame mounted in the vehicle defining an opening above the hopper when the hopper is in catching position, a pair of wings connected to opposite sides of the frame pivotal between catching positions oppositely upwardly inclined from the frame and retracted positions pivoted upwardly substantially vertically over the frame. The invention also includes the combination of a plurality of such catchers pivotally connected in following relation and with the wings forwardly and rearwardly overlapped in vertically spaced relation when in catching positions to avoid interference during relative pivotal movement of the catchers while forming a continuous catching surface.

11 Claims, 12 Drawing Figures

PATENTED OCT 17 1972

JOSEPH F. KENRICK
INVENTOR

Huebner & Worrel
ATTORNEYS

PATENTED OCT 17 1972

JOSEPH F. KENRICK
INVENTOR

Huebner & Worrel
ATTORNEYS

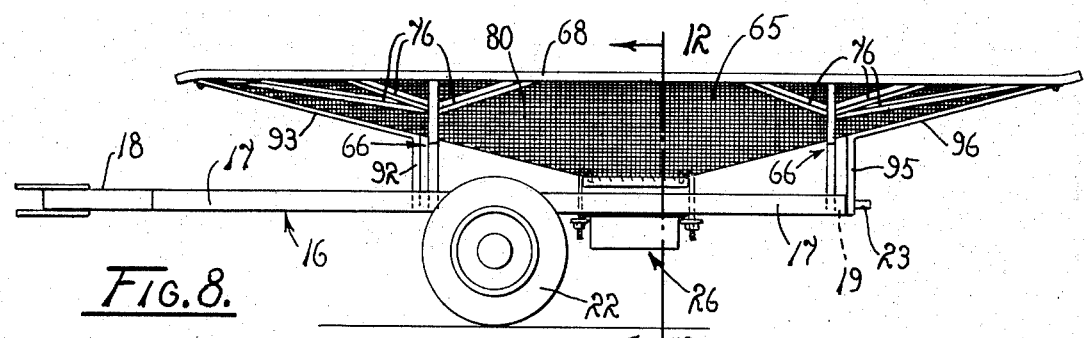
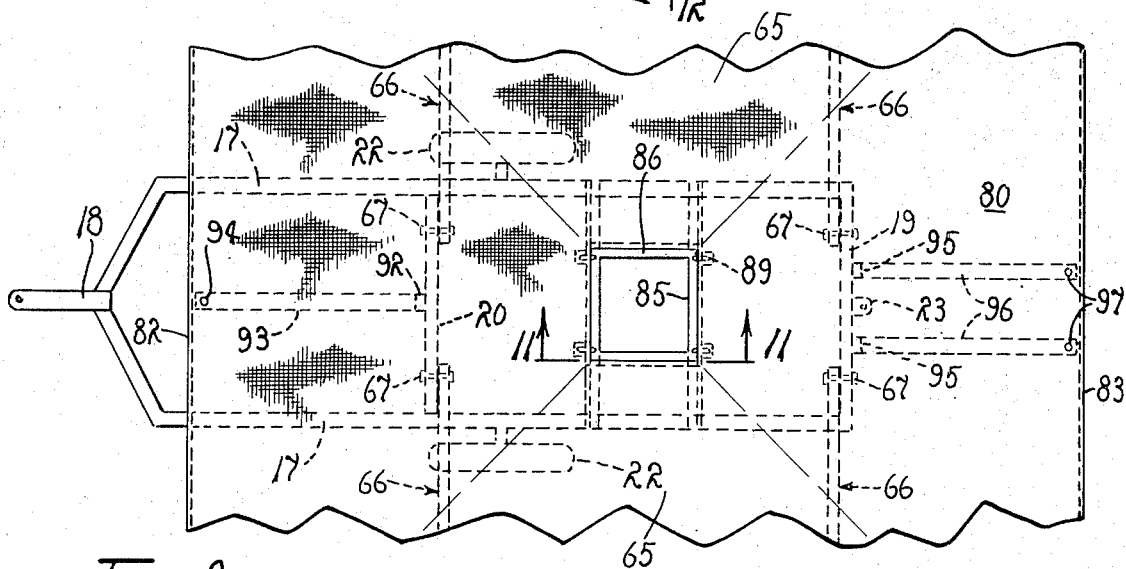
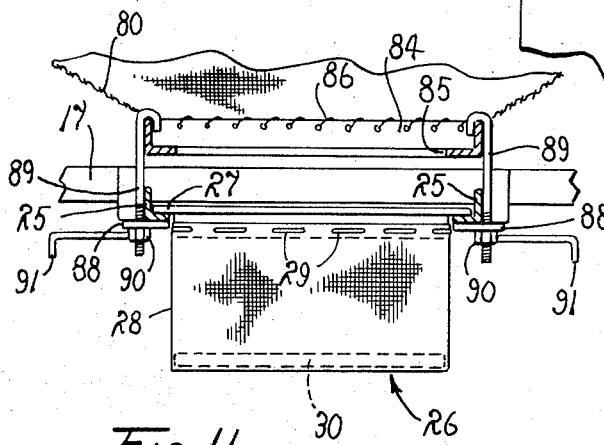
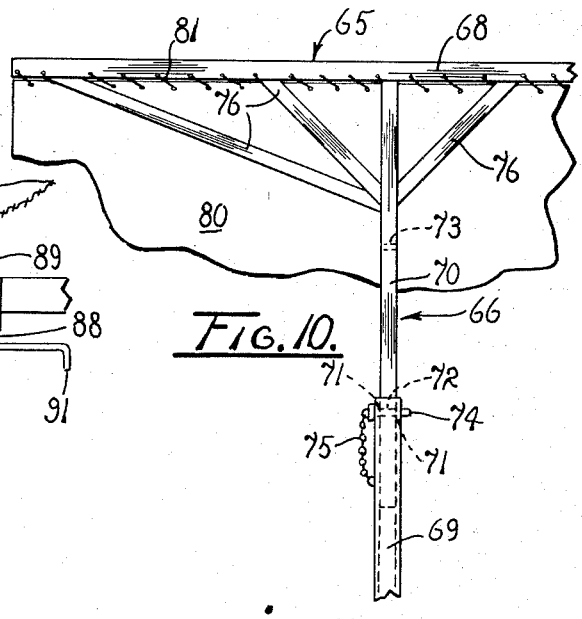
JOSEPH F. KENRICK
INVENTOR
Huebner & Worrel
ATTORNEYS

JOSEPH F. KENRICK
INVENTOR

CATCHER FOR FRUITS, NUTS, AND THE LIKE

BACKGROUND OF THE INVENTION

The present invention relates to fruit and nut catchers and the like and more particularly to such a mobile catcher adapted to be disposed beneath successive trees in a row to receive fruit and nuts shaken therefrom.

The ever increasing cost of farm labor coupled with the constant or decreasing price of farm products has compelled farmers to minimize their use of farm labor if they are to continue to produce crops. This has been particularly true in tree fruit and nut crops where the cost of harvesting in many instances has exceeded the total sale price of the fruits or nuts harvested.

In order to minimize harvest expenses, it has become popular mechanically to shake many crops from the trees for descent to the ground, after which they are gathered by suitable manual or mechanical means. However, this procedure has required meticulous preparation of the surface of the ground, the maintenance of a soil free of debris of the type which is frequently desirable as a cover crop, and general soil management based upon considerations other than maximum fertility and productivity. Further, many crops are damaged by bruising, abrasion, and contamination by being dropped on the ground.

A companion development has been to shake the fruit and nuts onto catchers which minimize crop damage, avoid crop contamination by falling on the ground, and minimize interference with proper soil management. However, such catchers have been subject to certain disadvantages which the present invention has sought to overcome. They frequently have been so cumbersome as to be difficult and time consuming to maneuver in orchards. Their sophistication frequently has led to high costs virtually precluding their general acceptance. Many have provided conveyors and other moving parts prone to maladjustment and failure.

SUMMARY OF THE INVENTION

An object of the present invention is, therefore, to provide an improved catcher for fruits, nuts, and the like.

Another object is to minimize hand labor in the harvest of fruits and nuts.

Another object is to harvest fruits and nuts mechanically with a minimum of damage thereto.

Another object is to provide such a catcher which is of simple construction and is economical to produce.

Another object is to provide such a catcher which avoids all driven parts and mechanisms so as to obviate the problems incident thereto.

Another object is to provide a catcher which is quickly and easily adjusted between catching and transporting conditions.

Another object is to provide a catcher from which fruit and nuts which have been harvested can quickly and easily be removed.

Another object is to provide such a catcher having oppositely extended wings pivotal between laterally extended catching positions and upwardly extended transport and stowing positions.

Another object is to provide such a catcher which can be towed with the wings in upwardly extended transport position with a minimum of interference from wind.

Another object is to provide such a catcher in which the wings are telescopic to permit maximum extension in catching position and minimum extension in transport and stowing positions.

Another object is to provide a catcher with oppositely extended wings pivotal between laterally extended catching positions and upwardly extended transport and stowing positions, in which the wings are rigid frames covered with sheet material.

Another object is to provide such a catcher in which the sheet material can be tensioned in catching positions without interfering with pivotal movement to transport or stowing positions or telescopic extension or retraction.

A further object of the invention is to provide a plurality of such catchers pivotally interconnected in following relation to each other and forwardly and rearwardly overlapped so as to provide a substantially continuous catching surface without interference with turning action and relative pivotal movement.

Still further objects and advantages are to provide improved elements and arrangements thereof in a catcher of the character and for the purposes set forth.

BRIEF DESCRIPTION OF THE DRAWINGS

FIG. 8 is a side elevation of a second form of the present invention in catching adjustment.

FIG. 9 is a fragmentary top plan view thereof.

FIG. 10 is a somewhat enlarged fragmentary side elevation of the catcher of the second form showing a telescopic boom and spar mounted thereon.

FIG. 11 is a somewhat enlarged fragmentary section taken on line 11—11 of FIG. 9.

DESCRIPTION OF THE FIRST EMBODIMENT

Figure 1:
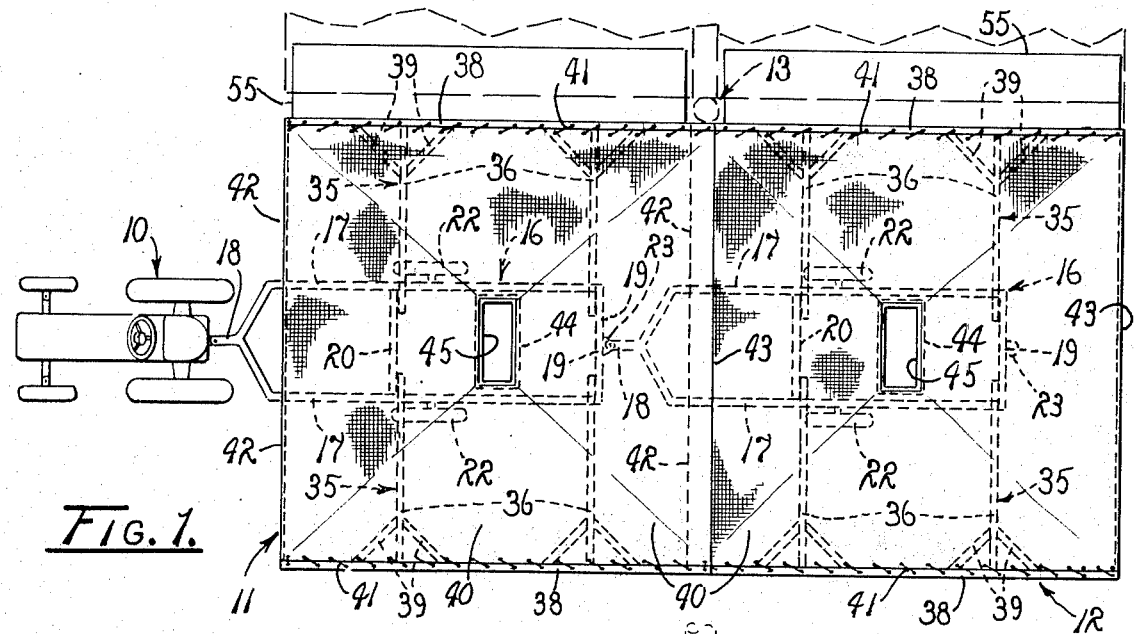
FIG. 1 is a top plan view of a pair of catchers of the present invention connected in trailing relation to a tractor utilized to impart earth traversing movement thereto.
Figure 2:
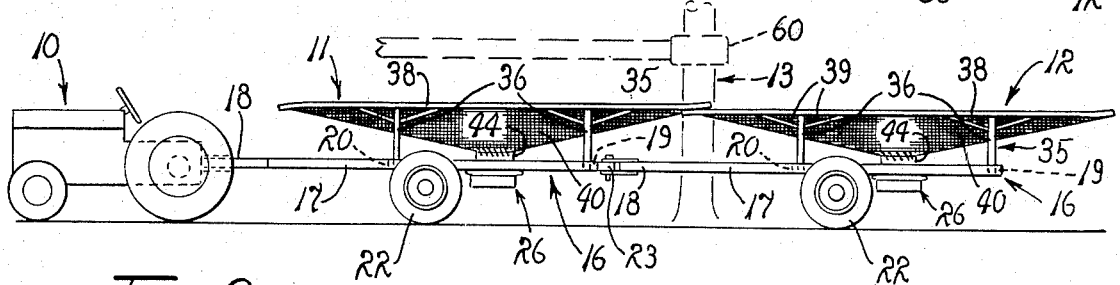
FIG. 2 is a side elevation of the structure shown in FIG. 1 disposed adjacent to a fragmentarily represented tree having a shaking mechanism schematically represented thereon.
Figure 3:
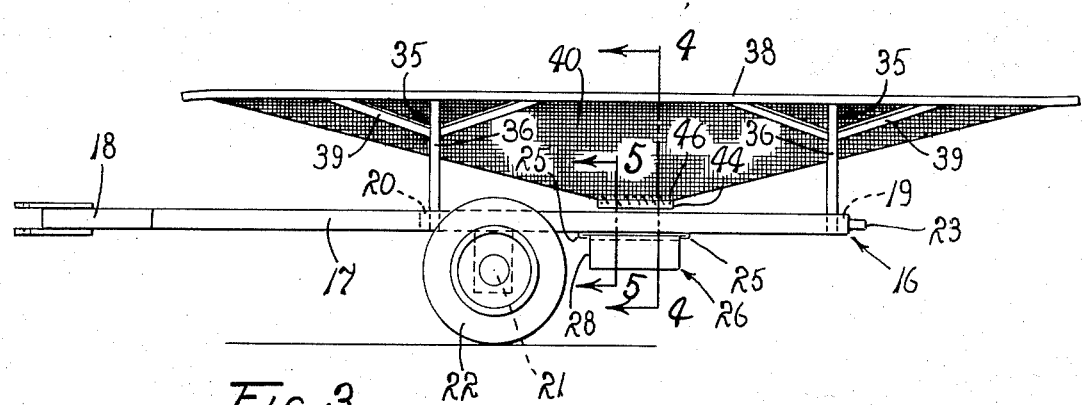
FIG. 3 is a somewhat enlarged side elevation of a single catcher of the present invention.

In FIGS. 1 and 2 a tractor is shown at 10 having a first catcher 11 and a second catcher 12, both embodying the principles of the present invention, coupled thereto for earth traversing movement. As will subsequently become apparent, the first and second catchers are identical. During harvest, it is usually the practice to employ a pair of tractors 10 each having a first and a second catcher coupled thereto. The tractors with their respective catchers travel on opposite sides of a row of trees 13, such as walnuts or the like.

Each catcher includes a two-wheeled trailer 16 having a frame providing a pair of substantially parallel side rails 17, a forwardly projecting tongue 18 and a cross member 19 at the rear thereof. The rails are also interconnected by a forward cross member 20 which is substantially parallel to the rearward cross member 19. The frame is supported on an axle 21 having opposite ends rotatably mounting support wheels 22. A trailer hitch 23 is preferably mounted on the rearward cross member 19 midway between the rails 17 and rearwardly extended therefrom.

Rearwardly adjacent to the wheels 22, a pair of substantially parallel tracks 25 is mounted transversely on the rails 17. The tracks are conveniently formed of angle iron members welded beneath the rails and having lower flanges extended toward each other.

A bin or hopper 26 is removably mounted on the tracks 25. The hopper provides a rectangular rim 27 fabricated from angle iron or the like so as to provide outwardly directed flanges and downwardly directed flanges. The downwardly directed flanges are perforated and a rectangular container 28 of canvas or the like is stitched to the downwardly directed flanges at 29. The outwardly directed flanges along the sides of the rim 27 are slidably supported on the tracks 25. The hopper is thus positionable midway between the rails 17 to receive fruit and nuts being harvested and can be removed from either side of the trailer 16 simply by sliding the hopper laterally of the trailer off the open ends of the tracks 25. The container 28 is preferably provided with a rigid floor panel 30 of masonite, plastic or the like of substantially the same size and shape as the rim 27. The floor panel aids in attaining maximum capacity with maximum ground clearance.

Figure 4:
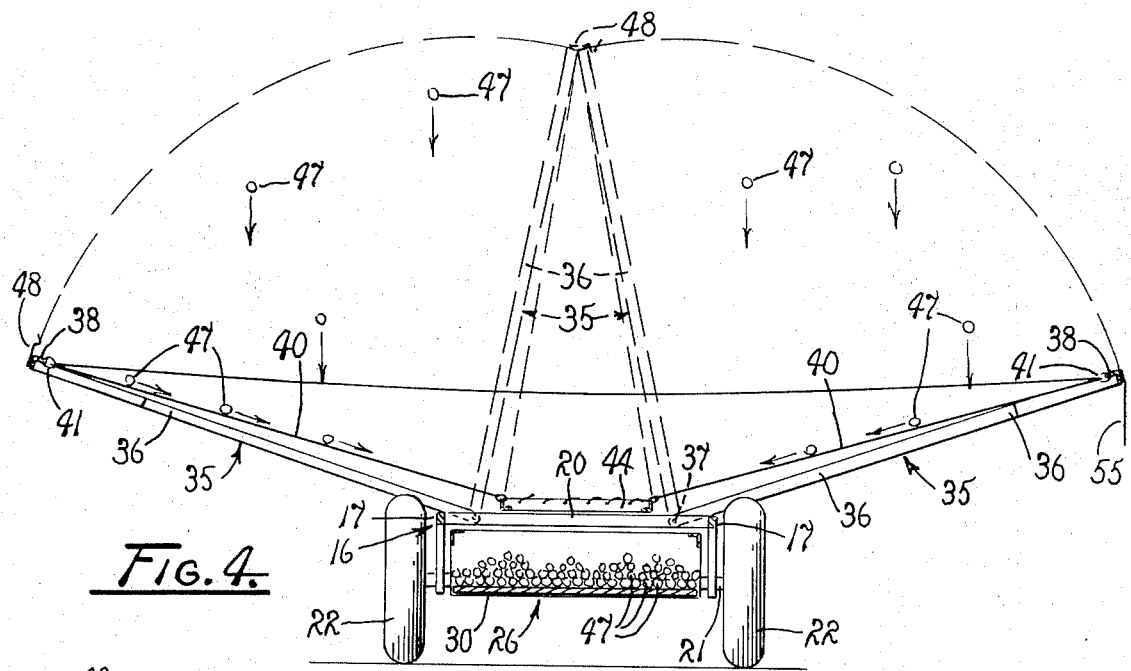
FIG. 4 is a section taken on line 4—4 in FIG. 3 showing the catcher in full line in catching adjustment and in dashed lines in retracted adjustment.
Figure 5:
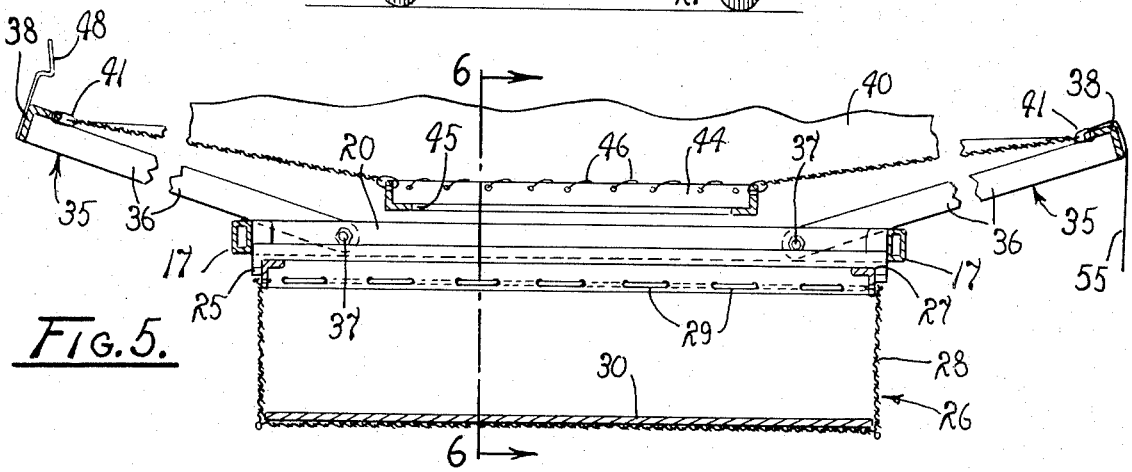
FIG. 5 is a section taken on line 5—5 in FIG. 3.
Figure 6:
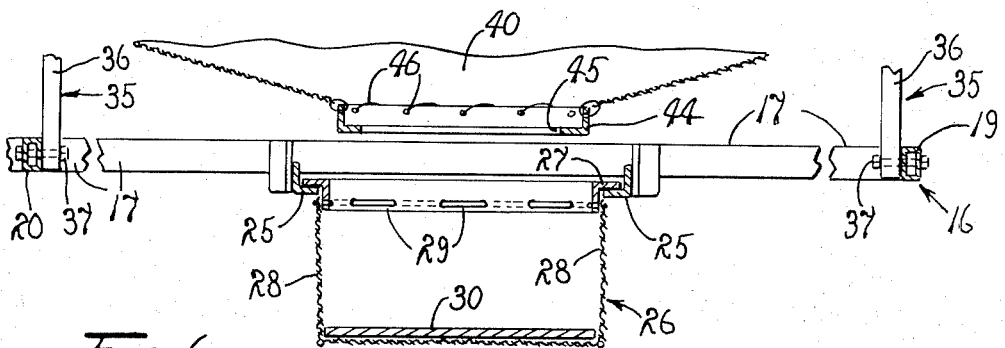
FIG. 6 is a fragmentary section taken longitudinally of a catcher of the present invention at the position indicated by line 6—6 in FIG. 5.

Each of the catchers 11 and 12 is provided with a pair of oppositely directed wings 35 which, as best seen in FIG. 4, are pivotal between outwardly inclined catching positions and upwardly convergent, substantially vertical, retracted positions. Each wing consists of a pair of booms 36. One thereof is pivotally mounted on the rearward cross member 19 adjacent to a rail 17 and the other pivotally mounted on the forward cross member 20 likewise adjacent to the rail 17. The booms are pivotally mounted on the respective cross members by aligned pivot pins or bolts 37. The pins are located in such relation to their respectively adjacent rails 17 that the booms can be rested against the rail, disposed in a common plane and outwardly inclined at an angle with respect to the horizontal suitable for the gravitational delivery of nuts or fruit along the wings toward the hopper 26. The angularity is not critical but 20° is found to be excellently suited to the purpose. A spar 38 is mounted on the outer ends of the booms of each wing in substantially parallel relation to their respective pins 37. For reasons which will subsequently become apparent, the forward end of each spar 38 is curved slightly downwardly and the rearward end thereof curved slightly upwardly when the booms are disposed on their respective rails. Braces 39 are provided between the booms and their respective spars to impart greater rigidity to the catcher.

As best shown in FIG. 1, the relative lengths of the booms 36 and spars 38 are such that the spars define the opposite sides of a substantially square area when the booms are rested on their respective rails. A substantially square sheet 40 of canvas, plastic, or other suitable material is lashed to the opposite spars 38 as shown at 41. The fore and aft edges 42 and 43 of the sheet 40 are hemmed or bound to form tubes through which lines, ropes or cables, not shown, are threaded and tensioned between the spars.

Figure 7:
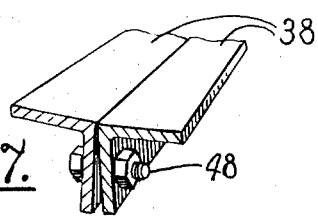
FIG. 7 is a fragmentary perspective of a catch utilized in releasably restraining retractible wings of the invention in retracted positions.

A rigid rectangular frame 44, similar in shape to the rim 27 of the hopper 26 is mounted in the sheet 40 directly above the hopper. The frame provides a discharge opening 45 juxtaposed to the hopper and the sheet is secured to the frame, as by lashing 46, to form a funnel leading to the opening when the wings are in catching position. When the booms 36 are disposed in their outwardly inclined positions, the sheet 40 is tensioned between the frame 44 and the spars 38 and between the lines or cables and the frame. The weight of the frame is sufficient to cause the sheet to sag so that fruit or nuts 47 descending onto the sheet gravitate downwardly along the sheet and through the opening 45 into the hopper 26. As the booms 36 are pivoted upwardly into their retracted positions, the frame 44 gradually descends into the hopper 26 positively to discharge all fruit and nuts which have descended onto the sheet into the hopper. To restrain the wings and thus the booms 36 in retracted position, bores are provided through the spars 38 which are aligned when the spars are in their retracted positions. Nut and bolt assemblies 48 are extended through the bores, as best shown in FIG. 7, releasably to hold them in their upwardly pivoted positions. To release the spars, the nut and bolt assemblies are simply removed and the wings lowered manually to catching positions.

For purposes subsequently to become apparent, an auxiliary flap 55 is stitched or otherwise secured to the sheet 40 along the outer edge of each wing 35 adjacent to its respective spar 38.

DESCRIPTION OF THE SECOND EMBODIMENT

With the first embodiment of the present invention, it was found that when the wings 35 were made large enough to accommodate large fruit and nut trees, they extended upwardly so high when in retracted positions that their transport in any but the mildest breeze presented serious difficulties. Further, in the larger sizes, the sheet material 40 tended to sag and thus to interfere with proper operation. The second embodiment has provided the solutions to these difficulties.

The second embodiment conveniently utilizes the same form of trailer 16, hopper 26, and mounting for the hopper 25–27 and thus these elements are given the same numbers where they appear in FIGS. 8 through 12 and are not further described at this point.

The second form of catcher utilizes oppositely directed wings 65 which are pivotal between outwardly inclined catching positions and upwardly convergent, substantially vertical, retracted positions. Each wing consists of a pair of telescopic booms 66. One thereof for each wing is pivotally mounted on the rearward cross member 19 adjacent to a rail 17 and the other pivotally mounted on the forward cross member 20 likewise adjacent to the rail 17. The booms are pivotally mounted on their respective cross members by aligned pivot pins or bolts 67. As before, the pins are located in such positions in relation to their respectively adjacent rails 17 that the booms can be rested against their rails, the booms of each wing being disposed in a plane common to its wing and outwardly inclined at an angle with respect to the horizontal suitable for the gravitational delivery of nuts or fruit along the wings toward the hopper 26. Also, as before, a spar 68 is mounted on the outer ends of the booms of each wing in substantially parallel relation to their respective pins 67.

As best shown in FIG. 10, each boom 66 consists of a base 69 having an extension 70 telescopically fitted thereto. The bases and the extensions are preferably formed of tubular members which are square in cross section, sometimes referred to as "box beams." A bore is formed transversely in each of the bases 69 near the upper ends thereof. Bores 72 and 73 are formed through each of the extensions in positions to register with the bores 71 in the bases 69 when the booms are respectively in extended and contracted adjustment. Each base is provided with a pin 74 that can be inserted through the aligned bores and which is affixed to its respective base by a chain 75 to avoid inadvertent misplacement. The spars 68 are also conveniently formed of box beams and any desired number of diagonal braces 76 weldably secured between the extensions 70 and the spars.

The relative lengths of the booms 66 when the booms are extended and the pins 74 in the bores 71 and 72 are such that the spars define the opposite sides of the substantially square area when the booms are rested on their respective rails 17. A substantially square sheet 80 of canvas, plastic, or other suitable material is lashed to the opposite spars, as shown at 81. The fore and aft edges 82 and 83 of the sheet are hemmed or bound to form tubes through which lines, ropes, or cables, not shown, are threaded and tensioned between the spars for support purposes.

A rigid square frame 84 is mounted in the sheet 80 directly above the hopper 26. The frame is conveniently formed of angle iron and defines a discharge opening 85 directly above the hopper. The sheet is secured to the frame, as by lashing 86, to form a funnel leading to the opening when the wings 65 are in catching position. When the booms 66 are disposed in their outwardly inclined positions, the sheet 80 is tensioned between the frame 84 and the spars 68 and between the lines or cables threaded through the edges 82 and 83 and the frame. As in the first form of the invention, the weight of the frame causes the sheet to sag so that fruit or nuts descending onto the sheet gravitate downwardly along the sheet to the opening 85 for passage into the hopper. However, in larger forms of the catchers of the present invention, it is desirable more positively to tension the sheet.

As best shown in FIG. 11, a pair of brackets 88 are welded on the bottoms of the tracks 25 and outwardly extended therefrom. The brackets are provided in longitudinally spaced relation along their respective tracks and bores are provided vertically therethrough. J bolts 89 are hooked over the frame 84, downwardly extended through the bores in the brackets, and provided with nuts 90 screw-threaded thereon beneath the brackets. The nuts 90 are preferably provided with outwardly extended cranks 91 to facilitate rotation of the nuts on the bolts. When the nuts are screwed upwardly on bolts, the bolts are drawn downwardly, the frame 84 pulled downwardly and the sheet 80 positively tensioned.

When the J-bolts 89 are utilized to tension the sheet 80, it is also desirable to resist the inward movement of the fore and aft edges 82 and 83 of the sheet 80. As best shown in FIGS. 8 and 9, a rigid post 92 is welded at the midpoint of the forward cross member 20 and upwardly extended therefrom. An arm 93 integral with the post is forwardly and upwardly extended therefrom and provides an extended end adjacent to the forward edge 82 of the sheet 80. The extended end of the arm has the sheet 80 riveted or otherwise secured thereto, as at 94, adjacent to the forward edge. Because of the trailer hitch 23, a pair of posts 95 are rigidly mounted on the rearward cross member 19 in substantially equally spaced relation to the trailer hitch and are upwardly extended. Arms 96 are rigidly mounted on the upper ends of the posts 95 and are rearwardly and upwardly extended therefrom providing rearward end portions adjacent to the aft edge 83 of the sheet 80. The sheet is riveted or otherwise fastened to the rearwardly extended ends of the arms, as at 97.

OPERATION OF FIRST EMBODIMENT

The operation of the catchers of the present invention is believed to be readily apparent and is briefly summarized at this point. As previously suggested, a pair of tractors 10 is preferably employed each having a first catcher 11 and a second catcher 12 coupled thereto in trailing relation. For transport purpose, the wings 35 are pivoted upwardly into the dashed line positions shown in FIG. 4 and releasably secured by engaging the clip 48, as shown in FIG. 7.

A row of trees 13 is selected for harvest. Before entering the grove, the wings 35 are unbolted and lowered into their catching position as shown in full line in FIG. 4. One of the tractors 10 with its trailers 11 and 12 is driven along one side of the row while the other tractor with its catchers is driven along the opposite side of the row. The tractors are stopped so that the four catchers form a square about the first tree 13 to be harvested. One of the auxiliary flaps 55 is laid between the adjacent catchers 11 and adjacent catchers 12 on opposite sides of the tree 13. The tree 13 is then shaken by any suitable means such as the mechanical shaker 60 fragmentarily shown in FIG. 2. The fruit or nuts are discharged onto the sheets 40 down which they roll for discharge through their respective openings 45 into the hoppers 26.

When a hopper 26 is filled or has received a sufficient quantity of fruit or nuts to be emptied, it is slid outwardly on the tracks 25 and removed from the catcher for emptying into pallet bins, trucks, or other transporting or storing facility, not shown. After emptying, the hopper is slid inwardly on its tracks to its receiving position and the operation continued.

When the tree 13 has been harvested, the auxiliary flap 55 is turned backwardly over its respective catcher, the tractors are driven to the next tree and the auxiliary flap returned to position. The procedure is then repeated.

Once the harvesting operation has started along a row of trees, it is the usual practice to leave the wings 35 in their outwardly inclined catching positions to avoid any interference with the limbs of the trees during movement. However, whenever desired, the wings can be pivoted into their upwardly convergent position. As they are upwardly pivoted, the inclination of the wings obviously increases, the frame 44 descends into its respective hopper 26, and the fruit or nuts are positively discharged into the hopper without any opportunity for spillage or discharge outside of the hopper as long as it is properly positioned on its tracks 25.

When the wings 35 are in catching position, the fore and aft edges 42 and 43 overlap to assure the proper catching of all descending fruit and nuts. The overlapped edges are vertically spaced so that there is no interference between them during earth traversing movement and relative pivotal movement of the trailers 16.

OPERATION OF SECOND EMBODIMENT

Figure 12:
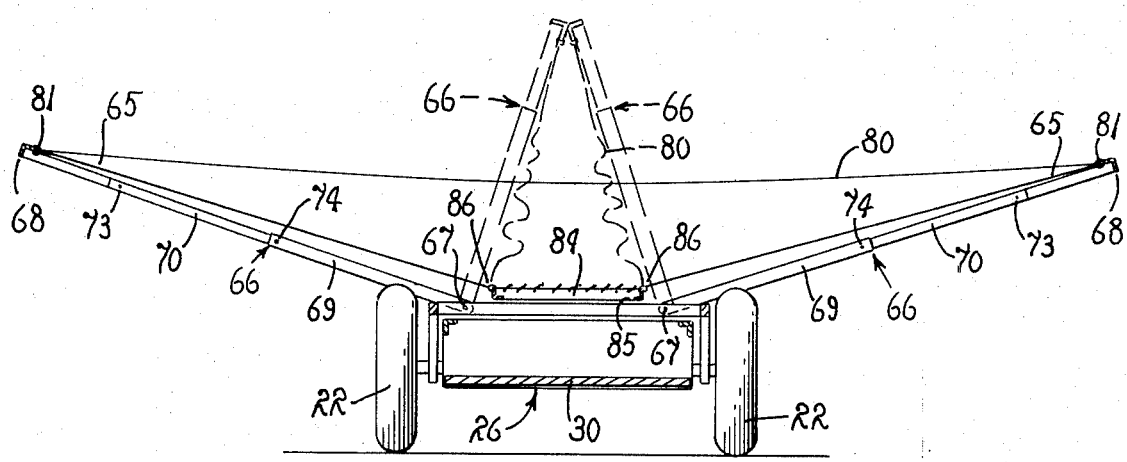
FIG. 12 is a section taken on line 12—12 of FIG. 8 showing the catcher in full lines in catching adjustment and in dashed lines in transport or stowing adjustment with the wings thereof telescopically retracted and upwardly pivoted.

If the second embodiment of the catcher of the present invention has been stowed in the adjustment shown in dashed lines in FIG. 12, it is towed in such adjustment to the orchard to be harvested. With the booms 66 telescopically retracted, the catcher presents a minimum silhouette to the wind and thus avoids the problem of being upset or difficult to control while being towed. When the position of use is reached, one of the wings 65 is pivoted to its catching position with the booms 66 rested on the adjacent side rail 17. The 17. 70 of such wing are then drawn outwardly of their respective bases 69 to achieve telescopic extension, and the pin 74 is inserted through the aligned bores 71 and 72. The wing which has thus been extended, is then pivoted upwardly to its retracted transport position where it is held by any suitable means, not shown, and the opposite wing is pivoted downwardly so that its booms 66 rest on its respectively adjacent side rails 17. The extensions 70 of said opposite wing are then drawn outwardly to extended positions and the pins 74 extended through the aligned bores 71 and 72. The raised wing is then pivoted downwardly so that both wings are disposed in catching position, as shown in full line in FIG. 12. When the wings 65 have been lowered to their catching positions, as shown in FIG. 12, the cranks 91 are manipulated to screw the nuts 90 upwardly on the J bolts 89 to draw the bolts downwardly and thus to tension the sheet 80, as desired. Such tensioning places the arms 93 and 96 under compression and similarly places the booms 66 under compression. So adjusted, the catcher is disposed beneath a tree from which the fruit or nuts are to be shaken either singly or in cooperation with other catchers, as previously disclosed.

As the nuts 47 are shaken onto the sheet 80, they gravitate downwardly through the opening 85 and into the hopper 26. When the hopper is filled, it is drawn outwardly on its tracks 25, as before, emptied, and replaced. With the sheet 80 positively tensioned between the frame 84 and the spars 68, as well as between the frame 84 and the extended ends of the arms 93 and 96, the fruit or nuts readily descend to the opening 85.

As before, the catcher is moved from tree to tree until the picking operation is completed. When it is desired to retract the wings 65 for transport or stowage, the tension on the sheet 80 may first be relieved by loosening the nuts 90. However, this is not necessarily required. The booms 66 at one side of the catcher are then telescopically contracted by removing the pins 74 from the bores 71 and 72. The extensions 70 are then slid downwardly into their bases 69, and the pins 74 inserted through the aligned bores 71 and 73. The contracted booms are then pivoted into their upwardly retracted positions. The booms on the opposite side of the catcher are then similarly contracted and pivoted to their upwardly retracting positions. This condition of adjustment is shown in dashed lines in FIG. 12. It will be noted that although the wings are contracted, the sheet 80 remains tensioned longitudinally of the trailer 16 between the extended end of the arm 93 and the extended ends of the arms 96. This supports the frame 84 in continuous engagement with the J-bolts 89.

The catchers of the present invention are simple in structure, economical to produce and easily maintained. They are fully effective in catching fruit and nuts which descend directly into the hoppers 26 and avoid all dirt and damage normally incident to striking the ground. In actual operation, they have saved as must as $200 per acre in harvesting costs when employed with young walnut trees as compared with conventional harvesting practices in which the walnuts are shaken to the ground and manually picked up and placed in boxes. Their use has obviated the previous necessity of carefully preparing the surface of the ground to receive the falling nuts or fruits and the interference with proper soil management that such preparation requires. Further, nuts harvested by the catcher are of substantially higher quality than those conventionally harvested. Still further, the economies and conveniences made possible by the catcher permit successive harvesting so as to achieve the highest possible grade for successively ripening nuts. Since price is dependent upon grade, the result is a substantially more profitable operation for the grower.

Although the invention has been herein shown and described in what are conceived to be the most practical and preferred embodiments, it is recognized that departures may be made therefrom within the scope of the invention.

Having described my invention, what I claim as new and desire to secure by Letters Patent is:

1. A catcher for nuts, fruit and the like comprising a vehicle; a hopper mounted on the vehicle; arms mounted on the vehicle for pivotal movement about individual substantially parallel axes at opposite sides of the hopper between positions oppositely laterally outwardly extended from the vehicle and positions upwardly convergently extended therefrom; spars individually mounted on the outer ends of the arms; a flexible sheet connected between the spars and extended transversely above the hopper, and a frame having an opening therethrough mounted in the sheet and supported thereby, the sheet being tensioned between the spars and said frame in all pivotal positions of the arms to cause the sheet to sag toward the frame for gravitational descent of objects caught by the sheet downwardly of the sheet, through the frame and into the hopper, the opening in frame being in a registry with the hopper in all corresponding pivotal positions of the arms.

2. The catcher of claim 1 in which the frame is receivable by the hopper and descends into the hopper when the arms are upwardly convergently extended and withdrawn from the hopper when the arms are laterally outwardly extended.

3. The catcher of claim 1 in which the sheet is substantially square, has an opening substantially centrally thereof fitted to the frame, and is connected to the frame in circumscribing relation thereto.

4. The catcher of claim 1 including means mounting the hopper for removal from the vehicle and for slidable movement between a receiving position below the opening in the frame and a position at the side of the vehicle.

5. A fruit and nut catcher comprising:
  A. first and second mobile vehicles having predetermined forward and rearward end portions,
    1. the first vehicle having a tongue forwardly extended therefrom adapted for connection to a tractive vehicle, and
    2. the second vehicle having a tongue forwardly extended therefrom and pivotally connected to the rearward end portion of the first vehicle in following relation thereto;
  B. a hopper mounted centrally on each vehicle;
  C. an opening defining frame positioned substantially horizontally on each vehicle above its respective hopper;
  D. a flexible catching sheet individual to each opening defining frame, supporting its respective frame and oppositely extended therefrom laterally of its respective vehicle; and
  E. means individual to each sheet movable between a catching position with its sheet laterally inclined from the frame and a retracted position with its sheet upwardly extended above the frame, said means for continuously tensioning its respective sheet between it and the frame,
    1. the sheets in their retracted positions upwardly converging over their respective frames, and
    2. the sheet of the first vehicle having a rearward end portion in overlapping relation to forward end portion of the sheet of the second vehicle.

6. The fruit and nut catcher of claim 5 in which the first and second vehicles and structure mounted thereon are substantially identical and the sheets in catching positions are slightly inclined longitudinally of their respective vehicles so that the forward end of the sheet of the rearward vehicle and the rearward end of the sheet of the forward vehicle are elevationally spaced to minimize interference during turning incident to the overlap of the sheets between vehicles.

7. In a fruit and nut catcher,
  A. a support frame;
  B. a hopper mounted on the support frame;
  C. an opening defining frame positioned substantially horizontally above the hopper;
  D. a flexible catching sheet connected to the opening defining frame, laterally extended therefrom, and supporting the frame thereon; and
  E. means for continuously tensioning the sheet between it and the opening defining frame, said means movable between a catching position with the sheet laterally inclined from the opening defining frame and a retracted position with the sheet upwardly extended over the opening defining frame, said means for supporting the frame in continuous registry with the hopper with the sheet tensioned between said means and the frame for gravitational descent of objects caught by the sheet therealong, through the frame and into the hopper.

8. The catcher of claim 7 in which the sheet is substantially square, has an opening substantially centrally thereof fitted to the frame, and is connected to the frame in circumscribing relation thereto; and including means mounting the hopper for movement between a receiving position beneath the opening defining frame and an emptying position at a side of the sheet when the sheet is in catching position, the hopper being removable from the frame at said emptying position.

9. A fruit and nut catcher comprising:
  A. a support frame;
  B. a hopper removably mounted in the frame;
  C. pairs of booms pivotally mounted in the frame on opposite sides of the hopper for movement between laterally extended positions and upwardly pivoted positions, the booms on each side of the hopper having substantially aligned pivotal axes and the axes on opposite sides of the hopper being substantially parallel;
  D. spars interconnecting the outer ends of the booms on each side of the hopper in substantially parallel relation to the axes, the spars being at elevations higher than the hopper in said positions of the booms;
  E. a sheet interconnecting the spars transversely above the hopper tensioned between the spars when the booms are in laterally extended positions, the sheet having an opening therein disposed above the hopper; and
  F. a frame mounted in the sheet in circumscribing relation to the opening supported by the sheet and depressing the sheet toward the opening for gravitational descent therealong of fruit and nuts dropped on the sheet, the frame being in registry with the hopper and said sheet being tensioned between the frame and the spars in all corresponding pivotal positions of the booms.

10. The catcher of claim 9 including anchor means interconnecting the support frame and the frame borne by the sheet adapted to draw the latter downwardly toward the hopper further to tension the sheet.

11. The catcher of claim 9 including means rigid with the frame disposed substantially midway between the spars on opposite sides of the hopper having the sheet connected thereto at positions substantially equally oppositely spaced from the hopper and at elevations above the hopper and tensioning the sheet across the hopper independently of the positions of the booms.

* * * * *